United States Patent [19]
Kosmatka et al.

[11] Patent Number: 5,873,627
[45] Date of Patent: Feb. 23, 1999

[54] KNEE ACTION SUSPENSION CONTROL SEAT

[75] Inventors: Gary Kosmatka, Colgate; Harold Van Duser, Reedsburg, both of Wis.

[73] Assignee: Seats, Inc., Reedsburg, Wis.

[21] Appl. No.: 694,471

[22] Filed: Aug. 7, 1996

[51] Int. Cl.⁶ .................................................... B60N 2/10
[52] U.S. Cl. .............. 297/326; 297/411.36; 297/411.38; 297/411.32; 248/421; 248/585
[58] Field of Search .......................... 297/411.36, 411.38, 297/411.32, 411.2, 326; 248/585, 586, 631, 421

[56] References Cited

U.S. PATENT DOCUMENTS

| | | | |
|---|---|---|---|
| 2,527,905 | 10/1950 | Barecki | 155/91 |
| 2,652,880 | 9/1953 | Gundersen | 155/51 |
| 2,840,140 | 6/1958 | Harrington | 155/51 |
| 2,894,562 | 7/1959 | Peller | 155/51 |
| 3,285,562 | 11/1966 | Langer | 248/399 |
| 3,298,654 | 1/1967 | Dome | 248/400 |
| 3,314,672 | 4/1967 | Persson | 267/1 |
| 3,519,241 | 7/1970 | Tschursch | 248/399 |
| 3,599,232 | 8/1971 | Tabor | 248/585 X |
| 3,608,855 | 9/1971 | Osenberg | 248/585 X |
| 3,628,763 | 12/1971 | Auer | 248/585 X |
| 3,711,149 | 1/1973 | Carter | 296/63 |
| 3,727,974 | 4/1973 | Swenson et al. | 297/300 |
| 3,743,230 | 7/1973 | Freedman | 248/585 X |
| 3,761,045 | 9/1973 | Sturhan | 248/399 |
| 3,788,697 | 1/1974 | Barton et al. | 297/307 |
| 3,879,007 | 4/1975 | Barton et al. | 248/400 |
| 3,913,975 | 10/1975 | Carter | 297/307 |
| 3,938,770 | 2/1976 | Turner et al. | 248/585 X |
| 3,954,245 | 5/1976 | Costin | 248/585 X |

(List continued on next page.)

FOREIGN PATENT DOCUMENTS

| | | | |
|---|---|---|---|
| 1070045 | 11/1959 | Germany | 63/46 |
| 1808330 | 5/1970 | Germany . | |
| 3535649 | 9/1987 | Germany . | |
| 355703 | 8/1961 | Switzerland . | |
| 422646 | 12/1974 | U.S.S.R. . | |
| 533508 | of 1976 | U.S.S.R. . | |
| 930903 | 5/1962 | United Kingdom . | |
| 1156941 | 6/1966 | United Kingdom | 47/15 |
| 2029208 | 3/1980 | United Kingdom . | |
| 2118031 | 10/1983 | United Kingdom . | |

OTHER PUBLICATIONS 16-624 Heavy Duty Low Profile Suspensions; author: Seats, Inc. (1992).

16-502 Transportation Seating; author: Seats, Inc. (1991).

Primary Examiner—Peter M. Cuomo
Assistant Examiner—Rodney B. White
Attorney, Agent, or Firm—Michael, Best & Friedrich

[57] ABSTRACT

A vehicle seat assembly having a seat mounted on a knee action suspension mechanism and hand controls for the operation of the vehicle that are mounted on the same suspension mechanism as a seat. More particularly, a seat assembly for a vehicle including a seat having a forward portion and a rearward portion. The seat assembly includes a knee action suspension mechanism mounted under the seat and resiliently supporting the seat for resilient movement such that the rearward portion of the seat is vertically movable and the forward portion of the seat is generally pivotable about a longitudinal axis adjacent the forward portion of the seat. The seat assembly has an armrest assembly supported for movement with the seat, the armrest assembly has a forward end and a hand control is connected to the forward end of the armrest assembly. The suspension mechanism includes a generally horizontal plate, the plate forms a unitary rigid support structure for the seat and the armrest assembly such that the seat and the armrest assembly move together. The armrest assembly is connected to and supported by the plate for movement with the seat. The armrest assembly is pivotally connected to the plate for pivotal movement with respect to the seat. The armrest assembly includes an armrest and a hand control carrier for supporting the armrest and the hand control for selective forward and rearward movement of the hand control and armrest with respect to the seat.

20 Claims, 6 Drawing Sheets

U.S. PATENT DOCUMENTS

| | | | |
|---|---|---|---|
| 3,984,078 | 10/1976 | Sturhan | 248/399 |
| 3,986,748 | 10/1976 | Magnuson | 296/65 |
| 3,994,469 | 11/1976 | Swenson et al. | 248/585 |
| 3,999,800 | 12/1976 | Penzotti | 47/30 |
| 4,034,948 | 7/1977 | Brownell | 248/372 |
| 4,097,088 | 6/1978 | Meiller | 297/411.38 |
| 4,125,242 | 11/1978 | Meiller et al. | 248/399 |
| 4,153,295 | 5/1979 | Boulanger et al. | 297/307 |
| 4,181,355 | 1/1980 | Grass et al. | 297/307 |
| 4,322,052 | 3/1982 | Hodge et al. | 248/420 |
| 4,351,556 | 9/1982 | Worringer | 296/63 |
| 4,478,308 | 10/1984 | Klaassen | 297/411.32 X |
| 4,494,794 | 1/1985 | Barley | 297/307 |
| 4,505,513 | 3/1985 | Barley | 297/307 |
| 4,621,864 | 11/1986 | Hill | 297/411.38 X |
| 4,674,798 | 6/1987 | Oeth et al. | 297/411.36 |
| 4,678,155 | 7/1987 | Carter | 248/564 |
| 4,702,454 | 10/1987 | Izumida | 248/585 |
| 4,702,520 | 10/1987 | Whisler et al. | 297/411.36 |
| 4,786,024 | 11/1988 | Goetz | 248/422 |
| 4,813,645 | 3/1989 | Iwami | 248/588 |
| 4,828,216 | 5/1989 | Van Duser | 248/248 |
| 4,884,841 | 12/1989 | Holley | 297/331 |
| 4,949,930 | 8/1990 | Van Duser | 248/421 |
| 4,979,716 | 12/1990 | Holdampf | 248/393 |
| 5,004,206 | 4/1991 | Anderson | 248/585 |
| 5,005,894 | 4/1991 | Nagata | 296/68.1 |
| 5,076,528 | 12/1991 | Van Duser | 248/419 |
| 5,458,399 | 10/1995 | Gezari et al. | 297/411.38 X |

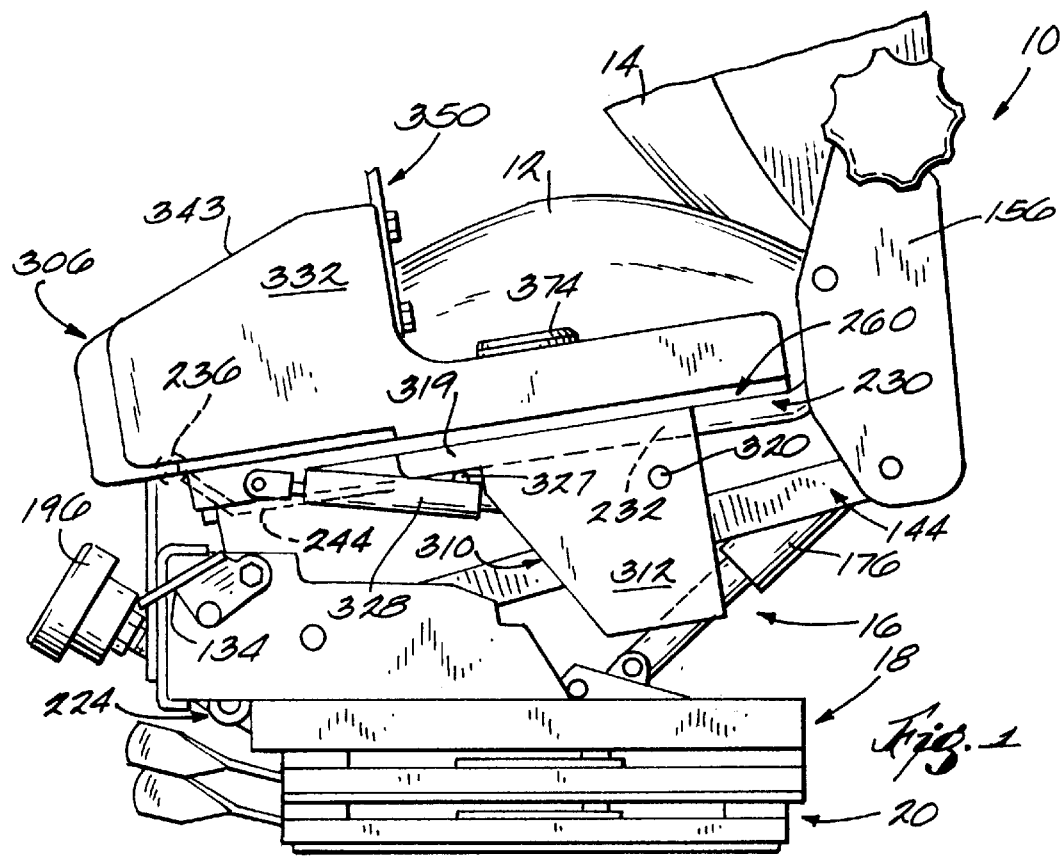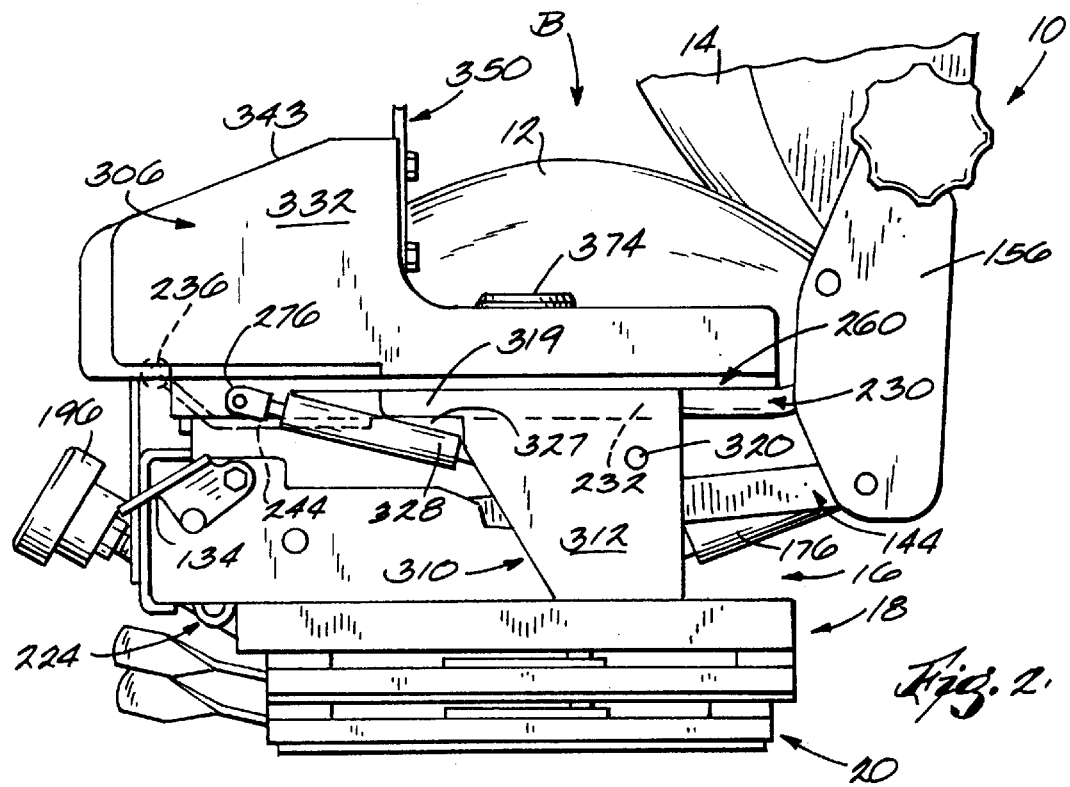

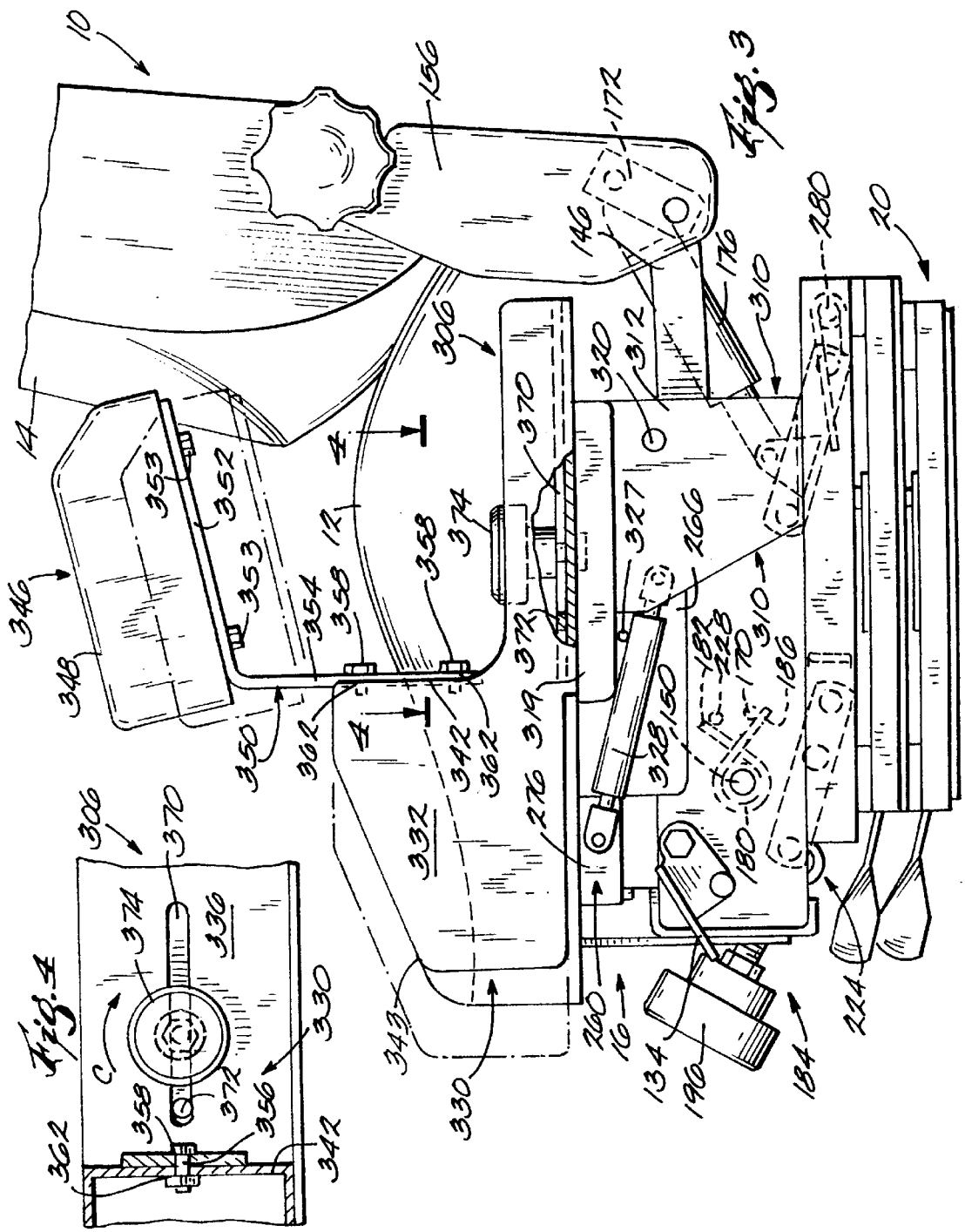

KNEE ACTION SUSPENSION CONTROL SEAT

FIELD OF THE INVENTION

The invention relates to seats which include vibration compensating suspension mechanisms. More particularly, the invention relates to a control seat assembly including a knee action suspension mechanism and hand controls for operating a vehicle mounted on the control seat.

BACKGROUND OF THE INVENTION

Seats of various vehicles such as skid steer loaders or logging machines are subject to substantial vibration as the vehicles travel over rough road and off road surfaces. A majority of seats now made for operators of such vehicles include a vibration compensating suspension mechanism beneath the seat. Such suspension mechanisms are in addition to the vehicle suspension systems which interpose the wheels of the vehicle and the vehicle bodies.

One type of suspension mechanism is the knee action suspension mechanism of the general type disclosed in U.S. Pat. No. 3,711,149. An improved type of knee action suspension mechanism is the floating knee pivot suspension mechanism disclosed in U.S. Pat. No. 4,949,930.

This suspension mechanism takes its name from a pivoting of the seat about the front of the seat during vibration. The pivoting is in the area of the knee of the seat occupant. Such pivoting is desirable because it minimizes movement of the lower leg during vibration. The knee of the seat occupant flexes as the seat pivots, maintaining foot contact with vehicle controls. The seat also improves the quality of the ride of the occupant by eliminating the tendency of the upper body of the occupant to strike the back of the seat during rebound from vibration.

Vehicles such as skid steer loaders or logging machines are also often operated through the use of hand controls, such as joy stick, or control levers. Such controls are commonly mounted on a separate suspension from the operating seats in the vehicle.

In such operating configurations, when vibration occurs, it is often difficult for the operator to maintain adequate hand contact with the hand controls for operation of the vehicle. Additionally, extra space is taken up by mounting the hand control and seat separately.

SUMMARY OF THE INVENTION

The invention provides a vehicle seat assembly having a suspension mechanism and hand controls for the operation of the vehicle, which are mounted on the same suspension mechanism as a seat. The invention also provides hand controls for the operation of the vehicle, which are mounted on a knee action suspension mechanism of a vehicle seat.

More particularly, the invention provides a seat assembly for a vehicle including a seat having a forward portion and a rearward portion. The seat assembly also has a suspension mechanism for supporting the seat for resilient movement such that the rearward portion of the seat is vertically movable and the forward portion of the seat is generally pivotable about a longitudinal axis adjacent the forward portion of the seat. The seat assembly has an armrest assembly supported for movement with the seat, the armrest assembly having a forward end and a hand control connected to the forward end of the armrest assembly.

The invention also provides a seat assembly having a suspension mechanism mounted under the seat and resiliently supporting the seat. The seat assembly has an armrest assembly supported by the suspension mechanism for movement with the seat.

The invention also provides a seat assembly having a suspension mechanism mounted beneath the seat for supporting the seat for resilient movement. The seat assembly also includes an armrest assembly pivotally connected to the suspension mechanism for pivotal movement with respect to the seat.

The invention also provides a seat assembly for a vehicle including an armrest assembly supported for movement with the seat, the armrest assembly having a forward end and an armrest, and a hand control attached to the forward end of the arm rest assembly. The seat assembly further includes means for interconnecting the hand control and the armrest with the armrest assembly for selective forward and rearward movement of the hand control and armrest with respect to the seat.

Other factors and advantages of the invention will become apparent to those skilled in the art upon review of the following detailed description, claims, and drawings.

BRIEF DESCRIPTION OF THE DRAWINGS

FIG. 1 is a side elevation view of a knee action suspension seat embodying the invention and showing the seat and the suspension mechanism in an upwardly pivoted position.

FIG. 2 is a side elevation view of the seat shown in FIG. 1 showing the seat and the suspension mechanism in downwardly pivoted position.

FIG. 3 is a side elevational view of the seat shown in FIG. 1 with adjustment of the arm rests shown in phantom and with the seat suspension mechanism shown in phantom.

FIG. 4 is a cross-section view taken along lines 4—4 in FIG. 3.

DETAILED DESCRIPTION OF A PREFERRED EMBODIMENT

Figure 5:
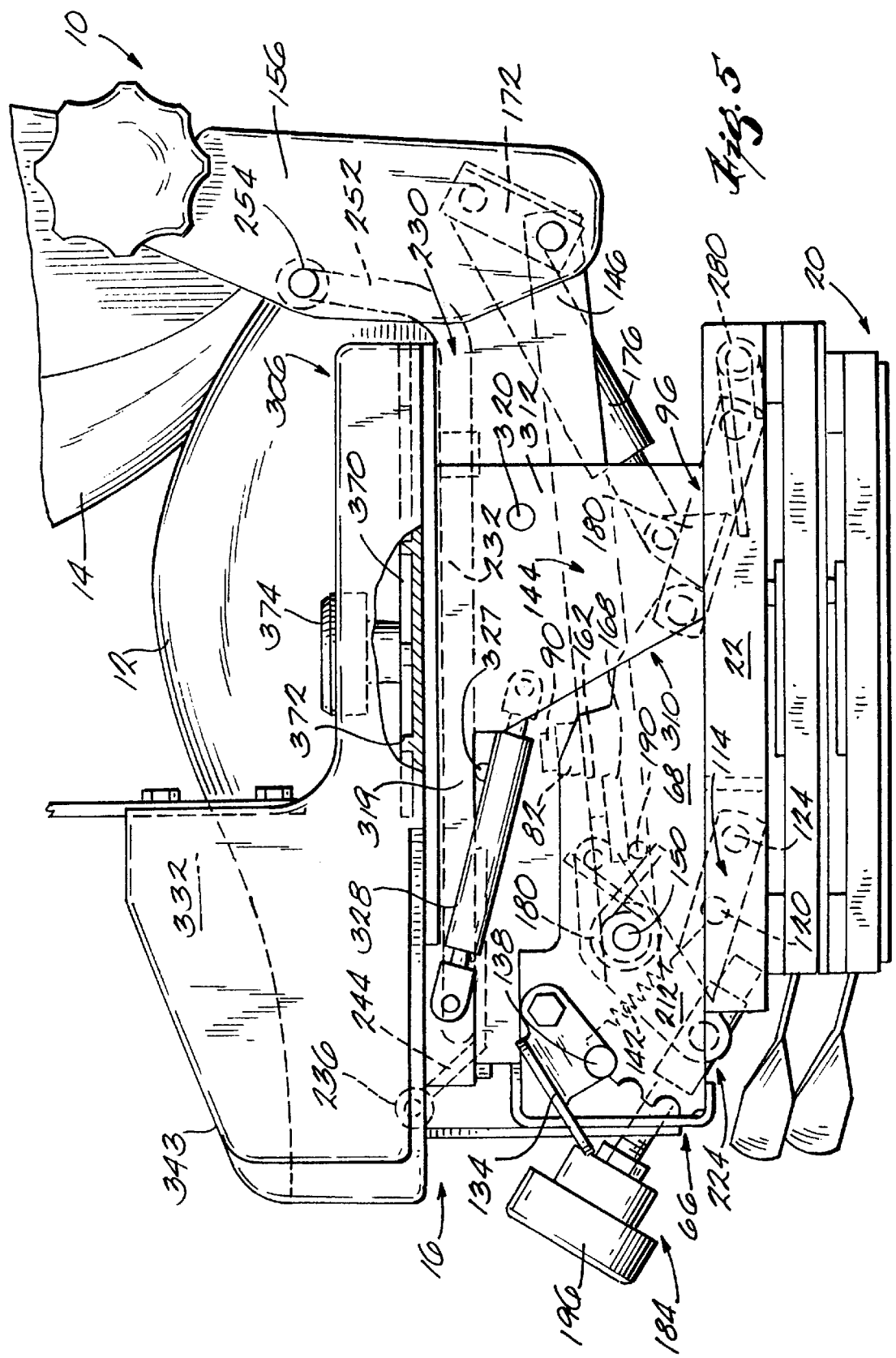
FIG. 5 is an enlarged view of the seat shown in FIG. 3 and showing the seat suspension mechanism in phantom.

Illustrated in FIGS. 1 and 2 is a vehicle seat 10 embodying the invention. The seat 10 includes a seat cushion 12 and a back cushion 14. The cushions 12 and 14 are mounted on a suspension mechanism 16. The suspension mechanism 16 is mounted on a base 18. The base 18 is mounted on a sliding mechanism or slide assembly 20 which is in turn mounted on a vehicle body. The sliding mechanism 20 permits selective forward and backward adjustment of the position of the suspension mechanism 16 relative to the vehicle body.

Figure 6:
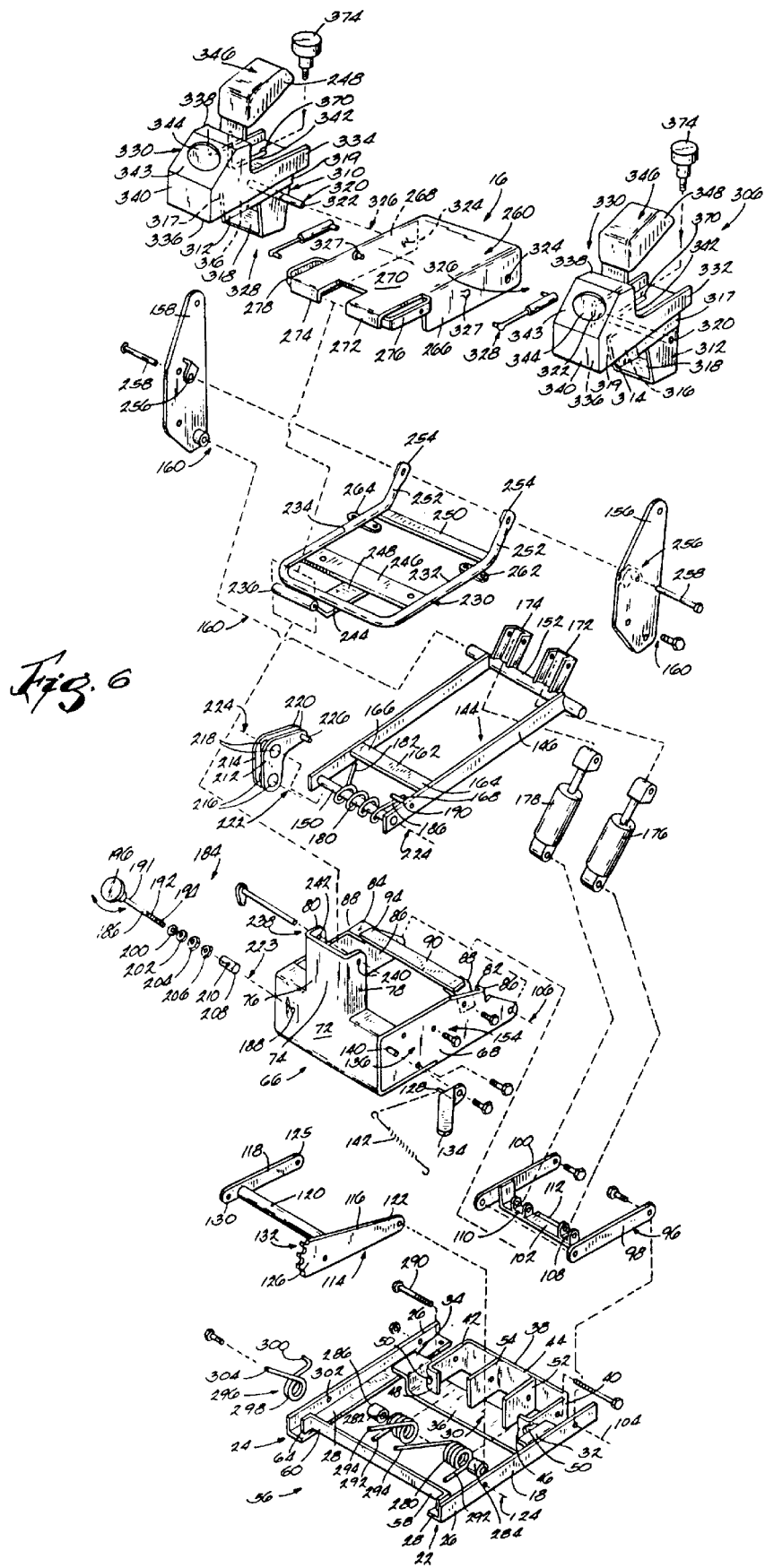
FIG. 6 is an exploded view of the suspension mechanism shown in FIG. 1 through 5.
Figure 8:
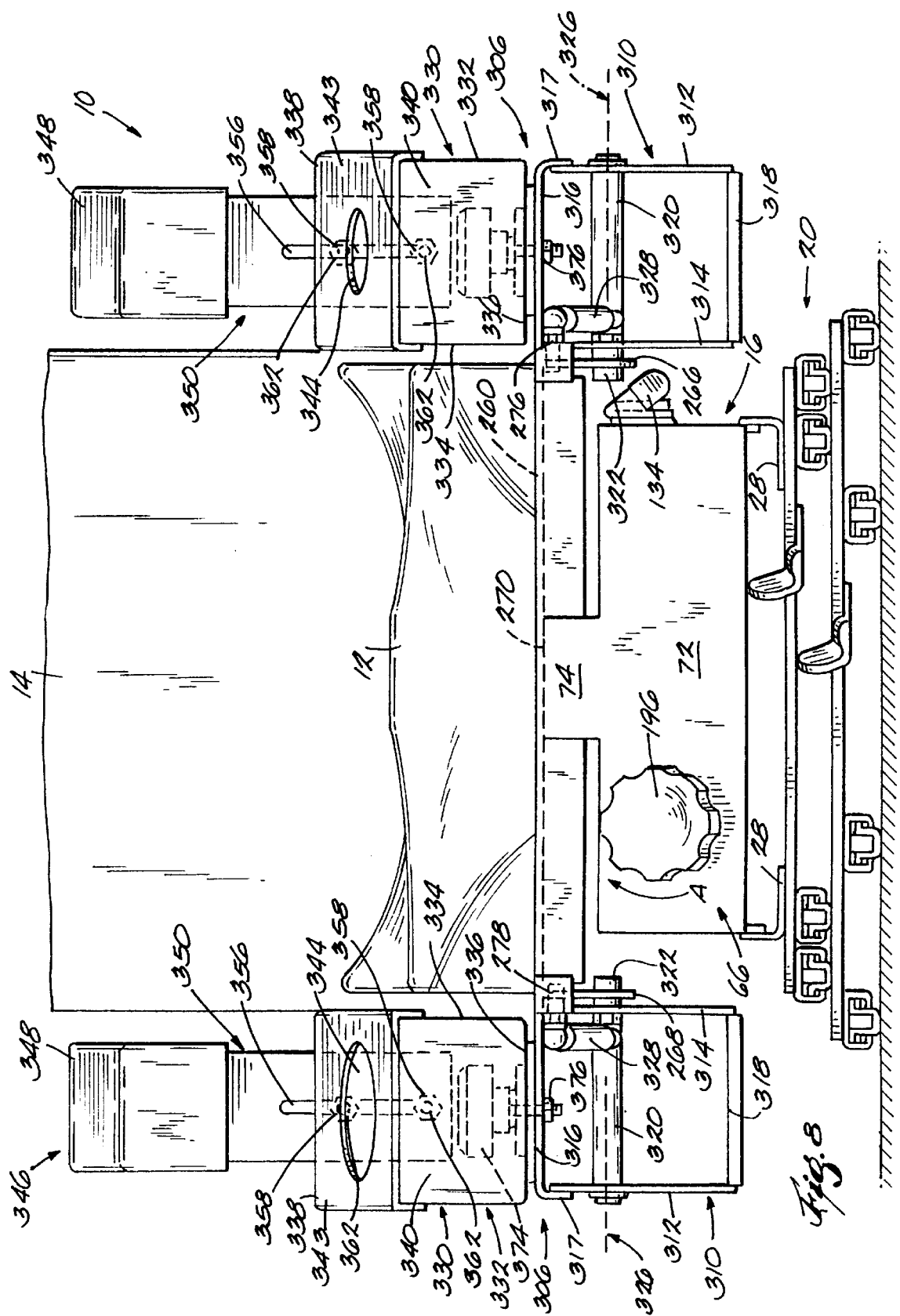
FIG. 8 is a front elevation view of the seat shown in FIG. 1.

Referring to FIG. 6, the base 18 includes a pair of elongated mounting brackets 22 and 24. The mounting brackets 22 and 24 are mirror images of each other. Each mounting bracket 22, 24 has a generally L-shaped cross section and includes a vertical outer wall 26. Each mounting bracket 22, 24 also has a horizontal bottom wall 28 extending at generally a right angle from the outer wall 26. The bottom walls 28 are connected to and supported for fore and aft adjustment by the sliding mechanism 20 (FIG. 8). The base 18 also includes a rear tie bar 30 extending between the mounting brackets 22 and 24. The tie bar 30 has opposed end portions 32 and 34 respectively connected to the brackets 22 and 24. The tie bar 30 has a downwardly offset central portion 36. The base 18 also includes a spring mounting bracket 38 mounted on the tie bar 30 central portion 36. The spring mounting bracket 38 includes opposed vertical side walls 40 and 42 connected by a vertical back wall 44. The forward ends of the side walls 40 and 42 have thereon respective inwardly extending flanges 46 and 48. Each flange 46, 48 has therein an aperture 50. A pair of spaced, vertical intermediate walls 52 and 54 extend from the back wall 44. The intermediate walls 52 and 54 are parallel to the side walls 40 and 42.

The base 18 also includes a front tie bar 56, extending between mounting brackets 22 and 24 forward of the rear tie bar 30. Tie bar 56 has opposed end portions 58 and 60 respectively connected to the bottom walls 28 of the mounting brackets 22 and 24. The opposed ends 58 and 60 of the front tie bar 56 have thereon respective forwardly extending flanges 62 and 64.

The suspension mechanism 16 includes a chassis housing 66 which is supported relative to the base 18 such that the housing 66 is vertically movable relative to the base. The housing 66 includes upright, parallel side plates 68 and 70 joined by an upright face plate 72. The plates 68 and 70 are welded metal plates. A stanchion 74 is welded to the face plate 72 and extends upwardly therefrom. The stanchion 74 has a "C" shape in horizontal cross section and includes a front wall 76 and spaced side walls 78 and 80 extending rearwardly from the front wall 76.

The chassis housing 66 also includes a pair of upper stop brackets 82 and 84. Each stop bracket 82 and 84 is L-shaped in cross section, and includes a vertical and downwardly extending outer wall 86. Stop brackets 82 and 84 each also have a horizontal and inwardly extending top wall 88. The chassis housing 66 also includes an upper tie bar 90 extending between stop brackets 82 and 84. The tie bar 90 has opposed end portions 92 and 94 respectively connected to the top of brackets 82 and 84.

The seat also includes a rear height adjustment bracket 96. The height adjustment bracket 96 is a generally H-shaped member including a pair of opposed arms 98 and 100 connected by a reactance member 102. The lower end of the arm 98 is connected to the outer wall 26 of the mounting bracket 22 for pivotal movement about a horizontal axis 104. The lower end of the arm 100 is connected to the outer wall of the mounting bracket 24 for pivotal movement about the same horizontal axis 104. The upper end of the arm 98 is connected to the side plate 68 of the housing 66 for pivotal movement about a horizontal axis 106. The upper end of the arm 100 is connected to the side plate 70 of the housing 66 for pivotal movement about the same horizontal axis 106. A pair of lower shock brackets 108 and 110 are connected to the reactance member 102. A spring retainer bracket 112 is mounted on the underside of reactance member 102 between the lower shock brackets 108 and 110.

The seat also includes a segmented link front height adjustment assembly 114. The front link assembly 114 is a generally H-shaped member having a segmented link 116 and an opposed riser link 118 connected by a cross member 120. A lower end 122 of the link 116 is connected to the outer wall 26 of the mounting bracket 22 for pivotal movement about a horizontal axis 124. The lower end 125 of the link 118 is connected to the outer wall 26 of the mounting bracket 24 for pivotal movement about the same horizontal axis 124. An upper end 126 of the link 116 is connected to the side plate 68 of the housing 66 for pivotal movement about a horizontal axis 128. An upper end 130 of the link 118 is connected to the side plate 70 of the housing 66 for pivotal movement about the same horizontal axis 128. The segmented link front height assembly 114 and the rear height adjustment bracket 96 cooperate to form a parallelogram arrangement for moving the housing 66 relative to the base 18 while substantially maintaining the relative horizontal orientation of the housing 66.

The upper end of the link 116 has therein a plurality of recesses or notches 132. The link 116 is movable relative to the housing 66 between a plurality of link positions corresponding to static vertical positions of the housing 20 relative to the base 18.

The seat also includes means for releasably locking the link 116 relative to the housing 66 to establish a static vertical position of the housing 66 relative to the base 18. In the illustrated embodiment, the locking means includes a lever 134 connected to the side plate 68 of the housing 66 for pivotal movement about a horizontal axis 136. The lever 134 includes a pin 138. The pin 138 extends inwardly through a slot 140 in the side plate 68. The lever 134 is selectively pivotable about the horizontal pivot axis 136 to move the pin 138 into and out of the notches 132. When the pin 138 is received in a notch 132, the link 116 is locked relative to the housing 66 and establishes a static vertical position of the housing 66 relative to the base 18. The link 116 is movable relative to the housing 66 between a plurality of link positions corresponding to different static vertical positions of the housing 66 relative to the base 18, and the lever 134 is operable for the pin 138 to selectively and releasably lock the link 116 relative to the housing in any one of the link positions. The releasable locking means also includes a pin retention spring 142 interconnected between the pin 138 and the cross member 120 of the front height adjustment link assembly 114. The spring 142 biases the pin 138 into engagement with a notch 132 when the lever is not being operated.

The suspension mechanism also includes a lower pivot arm assembly 144 which is pivotally movable relative to the housing 66 between upwardly and downwardly pivoted positions as shown in FIGS. 1 and 2. The lower pivot arm assembly 144 includes two mirror-image arms 146 and 148 formed of plate material and extending from a forward pivot arm tube 150 to a rear pivot arm tube 152 (FIG. 6). The forward pivot tube 150 extends between and is mounted on the side plates 68 and 70 of the housing 66 for pivotal movement relative to the housing 66 about a horizontal axis 154. The rear pivot arm tube 152 is mounted to a pair of back cushion frame brackets 156 and 158 for pivotal movement about a horizontal axis 160. An upper spring engagement bracket 162 extends between the arms 146 and 148. The upper bracket 162 has opposing ends 164 and 166 that are connected to arms 146 and 148 respectively. A spring engagement plate 168 is mounted to the underside of the end 164 of bracket 162, and extends forwardly therefrom. The spring engagement plate 168 is also connected to the side plate 68 of the housing 66 for additional support. A spring engagement rod 190 is mounted to the underside of a forwardly extending portion of the spring engagement plate 168.

The rear pivot arm tube 152 includes a right upper shock absorber mounting bracket 172 and a left upper shock absorber mounting bracket 174. A right shock absorber 176 is connected between the right upper shock absorber mounting bracket 172 and the right lower shock bracket 108. A left shock absorber 178 is connected between the left upper shock absorber mounting bracket 174 and the left lower shock bracket 110. The shock absorbers 176 and 178 are operable to support the rear portion of the lower pivot arm assembly 144 relative to the lower shock brackets 108 and 110.

The suspension mechanism 16 also includes a seat biasing spring 180. The seat biasing spring 180 is a torsion spring surrounding and mounted on a portion of the forward pivot arm tube 150. The spring 180 has an anchored end 182 that is received by a spring tension adjustment assembly 184. The spring 180 also has an operable end 186 that is received by and engaged with the spring engagement rod 190 interconnected with the lower pivot arm assembly 144. The spring 180 acts to bias the lower pivot arm assembly 144 towards an upwardly pivoted position.

The seat also includes means for adjusting the amount of biasing force that spring 180 places upon the lower pivot arm assembly 144. In the illustrated embodiment, the adjusting means includes the spring tension adjustment assembly 184. The spring tension adjustment assembly 184 includes a threaded adjustment bolt 136 extending through a hole 188 in the face plate 72 of the housing 66. The bolt 186 is adjustably interconnected with the anchored end 182 of spring 180. The bolt 186 can rotate about axis 223. The bolt 186 has a top portion 191, a middle portion 192, and a bottom portion 194. The top portion 191 extends outward from the housing 66, and has an adjustment handle 196 connected thereto. The middle portion 192 extends through the hole 188 and into a cavity 198 formed by the housing 66. A washer 200 and a bearing 202 surround the middle portion 192, and two nuts 204 and 205 surround and are threaded onto the middle portion 192. The nuts 204 and 206 are tightened against bearing 202 such that washer 200 is held firmly against the face plate 72. The bottom portion 194 extends from the middle portion 192 further into the cavity 198.

The spring tension adjustment assembly 184 also includes a cross bar 208 having a threaded bore 210 extending therethrough. The bottom portion 194 of the bolt 186 is threaded into and through the threaded bore 210. The cross bar 208 is supported by a pair of adjustment plates 212 and 214. The adjustment plates 212 and 214 are generally L-shaped plates each having a lower aperture 216, an intermediate aperture 218, and an upper aperture 220 extending therethrough. The cross bar 208 extends between and is supported by the lower apertures 216 for pivotal movement about axis 222. The forward pivot arm tube 150 extends through the intermediate apertures 218 and supports the plates 212 and 214 for pivotal movement about axis 224. A spring engagement rod 226 extends through and is connected to the upper apertures 220. The spring engagement rod 226 has an extended end 228 that engages and anchors the anchored end 182 of the spring 180. The anchored end 182 rests on top of the spring engagement rod 226.

When the adjustment bolt 186 is rotated in a clockwise direction from the front perspective about axis 223 as shown by Arrow A in FIGS. 6 and 8, the cross bar 208 is threaded further onto the bolt, resulting in upward movement of the crossbar 208 on axis 223. The upward movement of crossbar 208 results in movement of the plates 212 and 214 about axis 224. As a result, spring engagement rod 226 moves downwardly in relation to the spring 180. The anchored end 182 of the spring 180 also moves downwardly, thereby reducing the biasing force of the spring 180. When the adjustment bolt 186 is rotated in a counter-clockwise direction, the cross bar 208 is threaded further down on the bolt 186, resulting in pivotal movement of the plates 212 and 214 about axis 224. As a result, spring engagement rod 226 moves upwardly in relation to the spring 180. The anchored end 182 of the spring 180 also moves upwardly, thereby increasing the biasing force of the spring.

The suspension mechanism 16 also includes an upper pivot arm assembly 230. The upper pivot arm assembly includes mirror-image arms 232 and 234 extending rearwardly from a forward pivot arm pivot tube 236. The pivot tube 236 extends between the stanchion side walls 78 and 80 and is connected to the stanchion for pivotal movement about a horizontal axis 238. The pivot tube 236 is connected to the stanchion 74 by a pivot pin 241 extending through pivot tube 236 and a pair of pivot openings 240 and 242 adjacent the top of the stanchion 74. A connecting plate 244 joins the arms 232 and 234 and the pivot tube 236. The arms 232 and 234 are also connected by a front tie bar 246. The tie bar 246 is also connected to a rearward portion 248 of the connecting plate 244 to strengthen the assembly. A rear tie bar 250 extends between and is connected to the arms 232 and 234 at a point rearward of the front tie bar 246. Rear portions 252 of each arm 232 and 234 are angled upwardly in relation to the arms 232 and 234. The rear portion 252 of each arm 232 and 234 also has mounted thereon a respective pivot bushing 254.

The back cushion 14 is mounted on the back cushion frame brackets 156 and 158. Each of the brackets 156 and 158 has therein a respective pivot bracket 256. A pivot member such as a pivot pin 258 extends through the pivot bracket 256 and is received in the adjacent bushing 254 on the rear portion 252 of the upper pivot arm assembly 230.

The suspension mechanism 16 also includes a seat cushion mounting plate 260. The seat plate 260 is mounted to and covers the upper pivot arm assembly 230. Connecting members 262 and 264 are used to connect seat plate 260 to assembly 230. The seat plate includes upright parallel side plates 266 and 268 joined by a horizontal top plate 270. Two downwardly extending flanges 272 and 274 extend from the front portion of the top plate 270. A first gas spring attachment bracket 276 is mounted between and connected to the side plate 266 and flange 272. A second gas spring attachment bracket 278 is mounted between and connected to the side plate 268 and flange 274. Seat cushion 12 is connected to the upper surface of the top plate 270.

Referring to FIG. 2, when downward pressure, shown by Arrow B, is placed upon the seat 12 the lower pivot arm assembly 144 pivots clockwise relative to the housing 54 and acts against the biasing of the seat biasing spring 180 (FIG. 3). The brackets 156 and 158 move downwardly, the upper pivot arm assembly 230 pivots clockwise about the stanchion 74 and the rear portion of the seat plate 260 moves downwardly with the rear portions 252 of the arms 232 and 234. Thus, the seat cushion plate 260 is movable relative to the housing 66 in response to pivotal movement of the lower pivot arm assembly 144. The front portion of the seat remains generally in the same horizontal plane as the rear portion of the seat pivots downwardly.

Referring to FIG. 1, when less downward pressure is placed upon the seat 12, the seat biasing spring 180 (FIG. 3) biases lower pivot arm assembly 144 upwardly. The lower pivot arm assembly 144 pivots counter-clockwise relative to the housing 54, the brackets 156 and 158 move upwardly, the upper pivot arm assembly 230 pivots counter-clockwise about the stanchion 74 and the rear portion of the seat plate 260 moves upwardly with the rear portions 252 of the arms 232 and 234. Thus, the front portion of the seat remains generally in the same horizontal plane as the rear portion of the seat pivots upwardly.

The suspension mechanism 16 also includes means separate from the seat biasing spring 180 for moving the housing 66 upwardly relative to the base 18. In the illustrated embodiment, the housing moving means includes a right rear torsion spring 280 and a left rear torsion spring 282 (FIG. 6). The springs 280 and 282 are mounted on respective bushings 284 and 286. The bushing 284 is mounted in the spring mounting bracket 38 on a mounting member 288 extending between the side wall 40 and the intermediate wall 52. The bushing 286 is mounted in the spring mounting bracket 38 on a mounting member 290 extending between the side wall 42 and the intermediate wall 54. Each spring has an anchor end 292 which is received in the aperture 50 in the corresponding flange 46 or 48. Each spring has an elongated end 294 which is received by the spring retainer bracket 112 on the height adjustment bracket 96 and is operable to bias the height adjustment bracket 96 upwardly. The housing moving means also includes a front torsion spring 296. The spring 296 has a main portion 298 that rests on mounting bracket 24 between the outer vertical wall 26 and the flange 64 of the front tie bar 56. The spring 296 has an anchor end 300 which is received in an aperture 302 in the outer vertical wall 26 of the mounting bracket 24. The spring 296 has an elongated end 304 which is received by the forward pivot tube 150 of the lower pivot assembly 144, and is operable to bias the lower pivot assembly 144, and therefore the housing 66 upwardly. Thus, due to the biasing of springs 280, 282 and 296, when the lever 134 is operated to unlock the link 126 relative to the housing 66, the housing 66 moves upwardly relative to the base 18.

In operation, the lever 134 is operable to adjust the height of the seat cushion relative to the base 18. When the lever is operated to release the link 126 relative to the housing 66, the torsion springs 280 and 282 acting on the height adjustment bracket 96, and the torsion spring 296 biasing against the forward pivot tube 152, cause the housing 66 to move upwardly relative to the base 18. This adjustment is accomplished with a single hand operating the lever 134.

The seat also includes a pair of armrest assemblies, a right armrest assembly 306 and a left armrest assembly 308. The armrest assemblies 306 and 308 are mirror images of each other, and are supported by the seat cushion mounting plate 260 for movement with the seat assembly 12. Referring to FIGS. 6 and 8, the assemblies 306 and 308 each include an armrest undercarriage 310. Each undercarriage 310 includes parallel side plates 312 and 314, joined by an upper plate 316 and a lower plate 318. Upper and lower plates 316 and 318 are parallel to each other. Upper plate 316 includes two downwardly extending parallel flanges 317 and 319 on either side of the upper plate 316.

The undercarriages 310 each also include a pivot member or rod 320. Each pivot member 320 extends between and is connected to the side plate 312 and 314 of each armrest assembly 306 and 308 respectively. Pivot members 320 each have a first end 322 that extends through the respective side plates 314. Each first end 322 engages and is pivotally connected to the side plate 266 and 268 respectively at pivot points 324 of the seat plate 260 such that the armrest assemblies 306 and 308 are pivotable with respect to the side plates 266 and 268 about axis 326. A forward pivot stop 327 is mounted to each side plate 266 and 268. When the armrest assemblies 306 and 308 are pivoted forward, in a counter-clockwise direction as seen in FIG. 5, each of the forward pivot stops 327 engages flanges 319 to stop the forward pivotal motion of the armrest assemblies 306 and 308 and the armrest assemblies 306 and 308 rest in a generally horizontal position.

Figure 7:
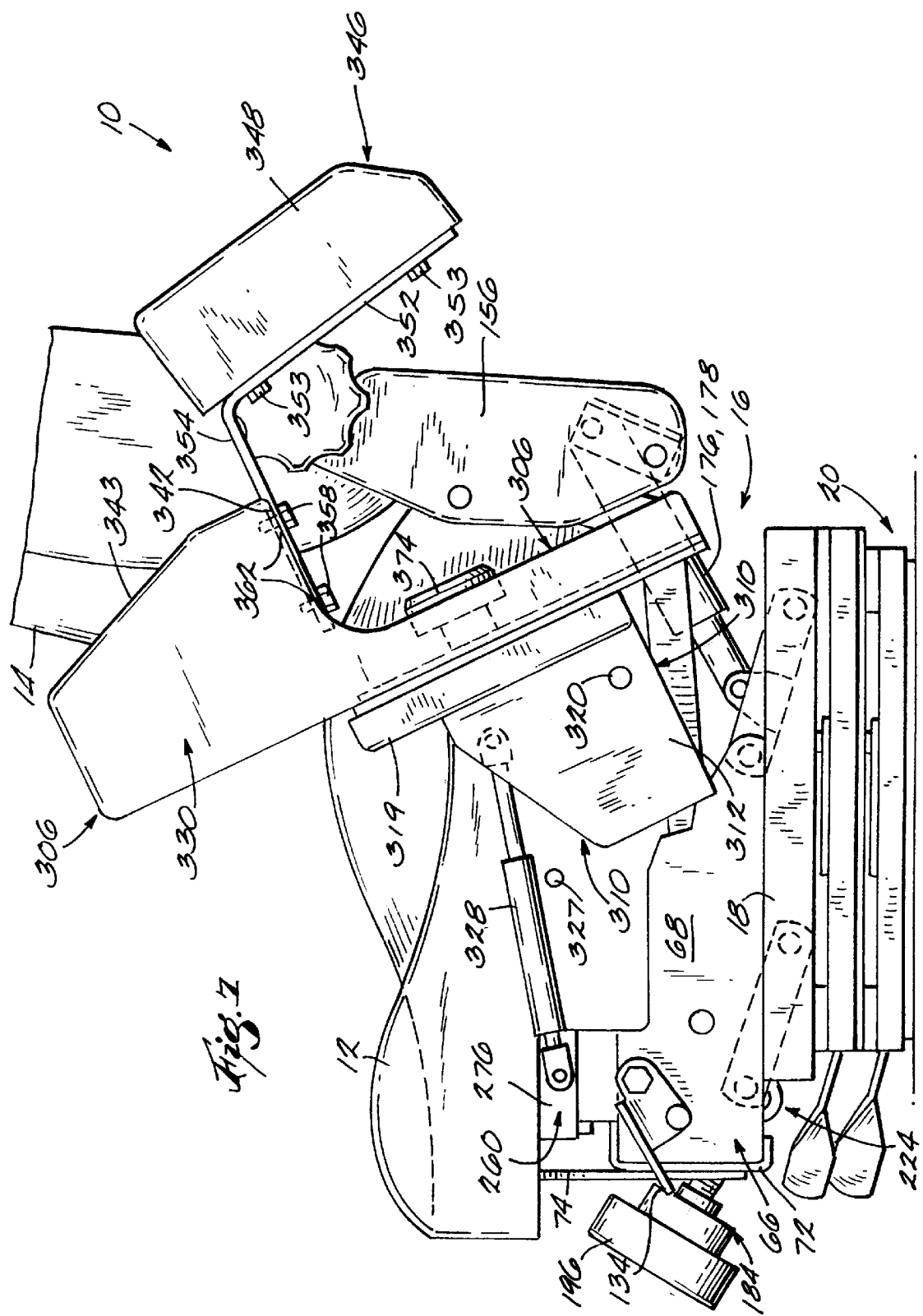
FIG. 7 view similar to FIG. 3 and showing an armrest of seat in raised position.

In the illustrated embodiment, a gas spring 328 is interconnected between each side plate 314 and the gas spring attachment brackets 276 and 278 respectively. The gas springs 328 enhance the pivotal movement of the armrest assemblies 306 and 308 about axis 326. Additionally, when each of the armrest assemblies 306 and 308 is pivoted rearwardly, in a counter-clockwise direction as seen in FIG. 7, each of the gas springs 328 stop the rearward pivotal motion of the armrest assemblies 306 and 308, to hold the armrest assemblies 306 and 308 in a generally vertical position.

The armrest assemblies 306 and 308 each also include a hand control carrier 330. Each hand control carrier 330 includes parallel side walls 332 and 334, joined by a bottom wall 336, and a top wall 338. Bottom wall 336 and top wall 338 are parallel to each other. Each hand control carrier 330 also includes parallel front wall 340 and rear wall 342. A control carrier lid 343 is releasably connected to and extends between the side walls 332 and 334 on each carrier 330. The lid 343 also extends between the top wall 338 and the front wall 340 on each carrier 330. The control carrier lids 343 each have a circular aperture 344 extending therethrough for interconnection with a hand control, such as a control lever or joy-stick (not shown), used for controlling a vehicle on which the seat assembly is mounted.

The armrest assemblies 306 and 308 also include means for adjustably connecting each hand control carrier 330 to the undercarriages 310 for selective forward and rearward movement with respect to the seat 12. In the illustrated embodiment, the connecting means includes an elongated slot 370 that extends through the bottom wall 336 of each hand control carrier 330 (FIG. 4). A guide pin 372 is connected to the upper plate 316 of the undercarriage assembly 310, and extends through the slot 370. A threaded adjustment lever 374 extends through the slot 370 and is threaded into a threaded bore 376 in the upper plate 316 of the undercarriage assembly 310. The threaded bore 376 is spaced on the upper plate rearward in relation to the guide pin 372. When the threaded adjustment lever 374 is rotated in a clockwise direction as shown by Arrow C in FIG. 4, the lever 374 is threaded further into the threaded bore 376, and the lever 374 fictionally engages the bottom wall 336 of the hand control carrier 330, and holds the hand control carrier 330 in static position in relation to the undercarriage 310. When the threaded lever 374 is rotated in a counter-clockwise direction, the lever 374 is threaded further out of the threaded bore 376, and the lever 374 generally disengages from frictional engagement with the bottom wall 336 of the hand control carrier 330 and allows the hand control carrier 330 to be slidably adjusted fore and aft in horizontal plane in relation to the undercarriage 310. The adjustability of the control carrier 330 is shown in phantom in FIG. 3. The resulting selective forward and rearward movement of the hand control carrier 330 with respect to the seat 12 allows for adjustability of the control carrier 330 to better facilitate use of the hand control by different sized operators.

The armrest assemblies 306 and 308 each also include an armrest 346 having an upper padded member 348 and a generally L-shaped support member 350 (FIG. 3). The support member 350 has an upper portion 352 and a lower portion 354. The padded member 348 is connected to the upper portion 352 with bolts 353. The lower portion 354 has an elongated slot 356 extending therethrough (FIG. 8).

The armrest assemblies 306 and 308 each also include means for adjustably connecting the armrest 346 to the control carrier 330 for selective vertical movement of the armrest 346 in relation to the control carrier 330. In the illustrated embodiment, the connecting means in each armrest assembly 306 and 308 includes a pair of bolts 358 that extend through the slot 356 in the support member 350 and are threadedly connected to threaded bores 362 in the rear wall 342 of the control carrier 330 (FIGS. 4 and 8). When the bolts 358 are threaded into and tightened into the threaded bores 362, they fictionally engage the support member 350 and hold the armrest 346 in static vertical position in relation to the control carrier 330. When the bolts 358 are loosened, the bolts 358 generally disengage from frictional engagement with the support member 350 and do not hold the armrest 346 in static vertical position in relation to the control carrier 330. The armrest 346 can be selectively adjusted in vertical position in relation to the control carrier 330. The adjustability of the armrest is shown in phantom in FIG. 3. The resulting selective vertical movement of the armrest 346 with respect to the seat 12 allows for adjustability of the armrest 346 for different sizes operators.

We claim:

1. A seat assembly for a vehicle comprising:

a seat having a forward portion and a rearward portion;

a suspension mechanism for supporting the seat for resilient movement such that the rearward portion of the seat is vertically movable and the forward portion of the seat is generally pivotable about a longitudinal axis adjacent the forward portion of the seat;

the suspension mechanism including a generally horizontal plate having a length and a width substantially coextensive with the seat, the plate having a first side and a second side;

an armrest assembly connected to one of the sides of the plate and supported for movement with the seat, the armrest assembly having a forward end;

a hand control connected to the forward end of the armrest assembly;

wherein the plate forms a unitary rigid support structure for both the seat and the armrest assembly such that the seat and the armrest assembly move together.

2. The seat assembly of claim 1, wherein the armrest assembly is pivotally connected to the plate for pivotal movement in relation to the seat.

3. The seat assembly of claim 2, further comprising a spring interconnected between the armrest assembly and the suspension mechanism.

4. The seat assembly of claim 3, wherein the spring is one of a gas spring and a compression spring.

5. A seat assembly for a vehicle comprising:

a seat having a forward portion and a rearward portion;

a suspension mechanism for supporting the seat for resilient movement such that the rearward portion of the seat is vertically moveable and the forward portion of the seat is generally pivotable about a longitudinal axis adjacent the forward portion of the seat;

an armrest assembly supported for movement with the seat, the armrest assembly having a forward end; and a hand control connected to the forward end of the armrest assembly;

wherein the armrest assembly includes an armrest, and a support for said armrest, and said armrest is adjustably connected to the support for selective vertical movement with respect to the hand control.

6. The seat assembly of claim 1, wherein the armrest assembly includes an armrest, and the armrest and hand control are interconnected with the armrest assembly for selective forward and rearward movement with respect to the seat.

7. A seat assembly for a vehicle comprising:

a seat having a forward portion and a rearward portion;

a suspension mechanism mounted under the seat and resiliently supporting the seat;

the suspension mechanism including a generally horizontal plate having a length and a width substantially coextensive with the seat, the plate having a first side and a second side;

an armrest assembly connected to one of the sides of the plate and supported by the plate for movement with the seat, the armrest assembly having a forward portion;

a hand control connected to the forward portion of the armrest assembly;

wherein the plate forms a unitary rigid support structure for both the seat and the armrest assembly such that the seat and the armrest assembly move together.

8. The seat assembly of claim 7, wherein the armrest assembly includes an armrest, and the armrest and hand control are interconnected with the armrest assembly for forward and rearward movement with respect to the seat.

9. The seat assembly of claim 7, wherein the seat includes an underside, and the plate is connected to the underside of the seat.

10. The seat assembly of claim 7, wherein the armrest assembly is pivotally connected to the plate for pivotal movement in relation to the seat.

11. The seat assembly of claim 10, wherein:

the armrest assembly further includes an armrest assembly undercarriage and a hand control carrier; and wherein the armrest and the hand control are adjustably connected to the hand control carrier, and the hand control carrier is adjustably connected to the armrest assembly undercarriage for selective forward and rearward movement with respect to the seat, and the armrest assembly undercarriage is pivotally connected to the plate.

12. A seat assembly for a vehicle comprising:

a seat having a forward portion and a rearward portion;

a suspension mechanism mounted under the seat and resiliently supporting the seat;

an armrest assembly supported by the suspension mechanism for movement with the seat, the armrest assembly having a forward portion, and a hand control connected to the forward portion of the armrest assembly;

wherein the armrest assembly includes an armrest, and a support for said armrest, and said armrest is adjustably connected to the support for selective vertical movement in relation to the hand control.

13. A seat assembly for a vehicle comprising:

a seat having a forward portion and a rearward portion;

a suspension mechanism mounted beneath the seat for supporting the seat for resilient movement such that the rearward portion of the seat is vertically movable and the forward portion of the seat is generally pivotable about a longitudinal axis adjacent the forward portion of the seat;

the suspension mechanism including a generally horizontal plate having a length and a width substantially coextensive with the seat, the plate having a first side and a second side; and an armrest assembly pivotally connected to one of the sides of the plate for pivotal movement with respect to the seat;

wherein the plate forms a unitary rigid support structure for both the seat and the armrest assembly such that the seat and the armrest assembly move together.

14. The seat assembly of claim 13, wherein the armrest assembly pivots about a pivot axis adjacent the rearward portion of the seat.

15. The seat assembly of claim 14, wherein the armrest assembly including a forward portion, and a hand control is connected to the forward portion of the armrest assembly.

16. The seat assembly of claim 13, further comprising a gas spring interconnected between the suspension mechanism and the arm rest.

17. The seat assembly of claim 13, further comprising a compression spring interconnected between the suspension mechanism and the arm rest.

18. A seat assembly for a vehicle comprising:

a seat having a forward portion and a rearward portion;

a suspension mechanism for supporting the seat for resilient movement such that the rearward portion of the seat is vertically movable and the forward portion of the seat is generally pivotable about a longitudinal axis adjacent the forward portion of the seat;

the suspension mechanism including a generally horizontal plate having a length and a width substantially coextensive with the seat, the plate having a first side and a second side;

an armrest assembly connected to one of the sides of the plate and supported for movement with the seat, the armrest assembly having a forward end and an armrest;

a hand control attached to the forward end of the arm rest assembly; and means for interconnecting the hand control and the armrest with the armrest assembly for selective forward and rearward movement of the hand control and armrest with respect to the seat;

wherein the plate forms a unitary rigid support structure for both the seat and the armrest assembly such that the seat and the armrest assembly move together.

19. The seat assembly of claim 18 wherein:

the armrest assembly further includes an armrest assembly undercarriage pivotally connected to the suspension mechanism, and a hand control carrier adjustably connected to the armrest assembly undercarriage for selective forward and rearward movement with respect to the seat; and wherein the interconnecting means includes the armrest and hand control being connected to the hand control carrier.

20. A seat assembly for a vehicle comprising:

a seat having a forward portion and a rearward portion;

a suspension mechanism for supporting the seat for resilient movement such that the rearward portion of the seat is vertically movable and the forward portion of the seat is generally pivotable about a longitudinal axis adjacent the forward portion of the seat;

an armrest assembly supported for movement with the seat, the armrest assembly having a forward end and an armrest and a support for the armrest;

a hand control attached to the forward end of the arm rest assembly; and means for interconnecting the hand control and the armrest with the armrest assembly for selective forward and rearward movement of the hand control and armrest with respect to the seat;

wherein the armrest is adjustably connected to the support for selective vertical movement with respect to the hand control.

* * * * *